United States Patent
Obendiek et al.

(10) Patent No.: US 6,916,061 B2
(45) Date of Patent: Jul. 12, 2005

(54) CLOSURE DEVICE FOR A CONVERTIBLE TOP

(75) Inventors: Klaus Obendiek, Passau (DE); Heinrich Wüllrich, Bogen (DE); Franz Haberl, Wallerfing (DE)

(73) Assignee: EDSCHA Cabrio-Dachsysteme GmbH, Hengersberg (DE)

( * ) Notice: Subject to any disclaimer, the term of this patent is extended or adjusted under 35 U.S.C. 154(b) by 45 days.

(21) Appl. No.: 10/661,258

(22) Filed: Sep. 12, 2003

(65) Prior Publication Data

US 2004/0169394 A1 Sep. 2, 2004

(30) Foreign Application Priority Data

Sep. 14, 2002 (DE) .......................... 102 42 773

(51) Int. Cl.[7] .............................................. B60J 7/185
(52) U.S. Cl. .................. 296/121; 296/224; 292/DIG. 5
(58) Field of Search ............... 296/121, 224; 292/DIG. 5

(56) References Cited

U.S. PATENT DOCUMENTS

| | | | |
|---|---|---|---|
| 4,974,902 A | * 12/1990 | Huiyer | 296/223 |
| 5,269,586 A | 12/1993 | Hahn et al. | 296/224 |
| 5,499,855 A | * 3/1996 | Andres et al. | 296/121 |
| 6,601,906 B2 | * 8/2003 | Deadrick et al. | 296/121 |
| 6,799,789 B2 | * 10/2004 | Guillez et al. | 296/121 |
| 2003/0146643 A1 | * 8/2003 | Dietl | 296/121 |

FOREIGN PATENT DOCUMENTS

| | | |
|---|---|---|
| DE | 10124937 | 8/2002 |
| EP | 0492006 | 7/1992 |
| EP | 0765771 | 4/1997 |

* cited by examiner

Primary Examiner—Stephen Gordon
(74) Attorney, Agent, or Firm—Davidson, Davidson & Kappel, LLC

(57) ABSTRACT

A closure device for a convertible top includes a lateral roof frame, a hoop element, and a pivotable hook arranged on the lateral roof frame which can be brought into engagement with the hoop element. The closure device also includes a first sliding element, the hook being accommodated in a pivotable manner on the first sliding element, and a second sliding element, it being possible for pivoting of the hook to be driven by a drivable movement of the second sliding element relative to the first sliding element.

10 Claims, 3 Drawing Sheets

CLOSURE DEVICE FOR A CONVERTIBLE TOP

Priority is claimed to German Patent Application DE 102 42 773.9, filed on Sep. 14, 2002, the entire disclosure of which is incorporated by reference herein.

BACKGROUND

The present invention relates to a closure device for a convertible top, comprising a lateral roof frame, a hoop element, and a pivotable hook arranged on the lateral roof frame and which can be brought into engagement with the hoop element.

Convertible-vehicle construction has provided convertible tops in which the lateral roof-frame parts can be secured on a frame element of the vehicle, in particular on a rigid windshield frame, such that they can be released by means of movable closure hooks and hoop catches which correspond with the latter and are provided on the windshield frame. In the case of convertible tops, which open and close in an automated manner, these closure devices are provided with a separate drive.

Also known are folding/sliding tops in which a front end of a flexible fabric is secured on a front bow and the front bow is accommodated in lateral roof frames such that it can be moved in the longitudinal direction of the vehicle.

Solutions in which linear guides are provided in the front roof-frame segments are known in particular, a catch hook which is retained in a pivotable manner at the end of the roof-frame segments or else on drivable sliding elements, which slide in the linear guides, being provided by means of the sliding elements. The sliding elements are driven in an advantageous and cost-effective manner here by means of known driving cables which, on the one hand, can be favorably produced as mass-production components and, on the other hand, take up only a small amount of space and can be adapted easily and universally as drive means. A fundamental disadvantage of such driving-cable drives is the only limited loading capacity of the driving cables in respect of the force transmission. The closure between the roof frames of convertible tops or front bows of folding/sliding tops and a front frame of the vehicle, however, on account of the high wind forces acting on the convertible top, needs to be generously designed in respect of the retaining force. In addition, tensioning is usually introduced into the covering fabric of the convertible top as the roof-frame segments are secured on the windshield frame, this requiring additional forces for the closure movement. The above described solutions are generally beset by the problem of relatively large frictional forces occurring when sliding elements are used. On the whole, it proves to be the case that the driving forces necessary for closing the roof-frame segments on the windshield frame exceed the driving forces that can be transmitted by commercially available driving cables. Use has thus been made, in the construction of convertible tops, of solutions that provide the use of two parallel drive motors in order to increase the advancement force of the sliding elements. Alongside additional costs and structural outlay, this solution is also unsatisfactory in that, in the case of the prior-art designs with the additional driving force, the frictional losses also increase, with the result that it is possible to achieve a less than proportional improvement in the forces which can ultimately be applied to the closure hook.

SUMMARY OF THE INVENTION

It is an object of the invention to provide a closure device for a convertible top in the case of which high closure forces can be achieved even if use is made of linear force-transmission means of relatively small dimensions.

The present invention provides a closure device for a convertible top that includes a lateral roof frame, a hoop element, a pivotable hook arranged on the lateral roof frame and which can be brought into engagement with the hoop element, a first sliding element, the hook being accommodated in a pivotable manner on the first sliding element, and a second sliding element, it being possible for pivoting of the hook to be driven by a drivable movement of the second sliding element relative to the first sliding element.

The provision of a second, drivable sliding element advantageously achieves the situation where, on the one hand, force transmission can take place during driving of the hook, which is secured in a pivotable manner on the first sliding element, and, on the other hand, the second sliding element can be optimized in respect of its low-friction guidance, while the first sliding element, which bears the closure hook, can be guided and dimensioned in respect of the closing and retaining forces which are to be applied.

In a preferred embodiment of the present invention, the first sliding element and the second sliding element are guided linearly on the roof frame in a linear guide, with the result that particularly straightforward movements and particularly straightforward structural arrangements are made possible.

A control link is particularly advantageously connected, on the one hand, in an articulated manner to the hook and, on the other hand, in an articulated manner to the second sliding element, with the result that corresponding force deflection, which makes it possible for the driven linear movement of the second sliding element to be converted into a rotary movement of the hook, can easily be realized with just a small number of components.

The second sliding element is particularly advantageously guided such that it can be moved linearly in a linear guide, the control link, over a first part of the linear movement, being retained relative to the second sliding element in a first position by means of the linear guide, and it being possible for the control link, over a second part of the linear movement, to be moved in relation to the second sliding element by means of a recess provided in the linear guide. In this way, a, in respect of the sliding elements, location-dependent activation of the rotary movement of the hook is achieved using extremely straightforward means, without additional or complex parts, for example special slot guides, having to be provided. It is possible, in principle, to provide a commercially available linear guide, formed for example as an extruded profile, for the purpose of guiding the sliding elements, it being possible for the activating means which triggers the closure operation to be designed by a simple recess in the linear guide.

The second sliding element can be driven, particularly advantageously, by means of a drive device, the drive device comprising a driving cable, and the driving cable being secured on the second sliding element. Using a driving cable results in the utilization of cost-effective mass-produced parts, which are available in a wide variety of embodiments, as are also used, for example, for driving side windows or sunroofs of motor vehicles.

Furthermore, it may particularly advantageously be provided that, in a position in which the hook is in full engagement with the hoop catch, the control link is arranged in a dead-center position or in an over-dead-center position in relation to the hook. As a result, in the case of the convertible top being subjected, from the outside, to the action of forces which ultimately subject the rotatable hook to a torque, a force which is directed essentially in the longitudinal direction of the control link is transmitted to the control link, this preventing further force transmission for example to a linear drive of the closure device. As a result, the roof frame is secured particularly reliably on the bodywork-mounted frame element.

Furthermore, a front bow of the convertible top may be secured, particularly advantageously, on the first sliding element. By virtue of rearward displacement of the first sliding element, the front bow is thus also displaced rearwardly relative to the roof frames. If the front bow is a front bow of a fully convertible top, then an essentially U-shaped region which is open to the front is produced in the front end region of the convertible top, this U-shaped region, in the case of many convertible vehicles, in particular in the case of small convertible vehicles, allowing the open convertible top to be advantageously stowed in the rear region of the vehicle since the roof frames, when they project freely in the forward direction, can be stowed to the sides of the rear passenger seats and thus do not take up a large amount of space. In the case of the front bow being designed as a front bow of a folding/sliding top, the combination of the first sliding element with the front bow provides a driven movement for the front bow and/or the entire folding/sliding top.

Further advantages and features of the present invention can be gathered from the exemplary embodiment described hereinbelow and from the dependent claims.

BRIEF DESCRIPTION OF THE DRAWINGS

A particularly preferred exemplary embodiment of the present invention is described hereinbelow and explained in more detail with reference to the drawings, in which.

DETAILED DESCRIPTION OF A PREFERRED EMBODIMENT

Figure 1:
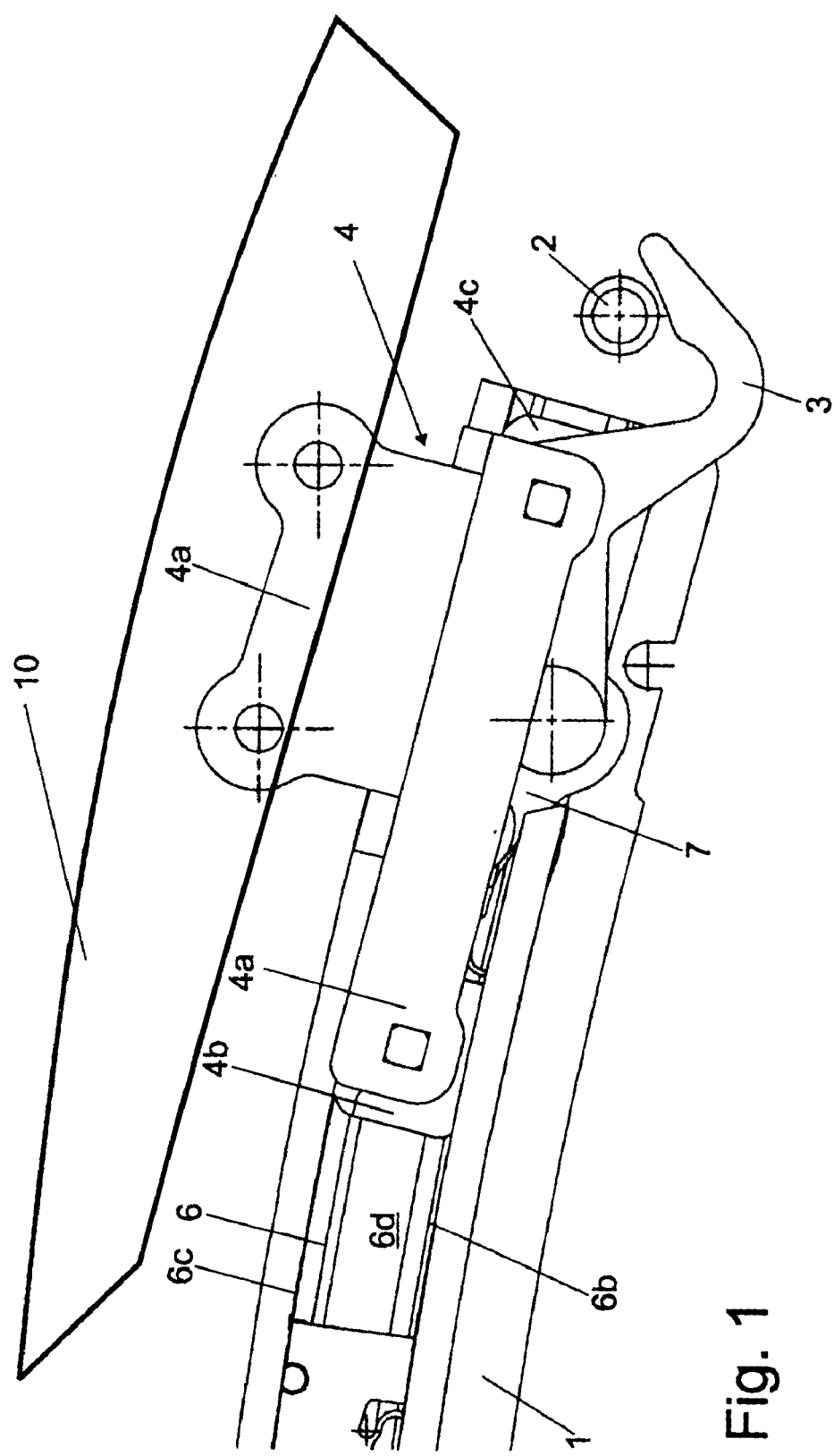
FIG. 1 shows a schematic side view of a closure device according to the invention for a convertible top, in an open state.

FIG. 1 shows a front end region of a lateral roof frame 1 of a convertible top, in particular of a folding/sliding top, which can be connected in a releasable manner to a frame element (not illustrated), in particular a front frame of a windshield. This allows the folding/sliding top to be removed altogether, with the result that the vehicle can be a fully convertible vehicle. A hoop catch 2 is provided on the lateral roof frame 1.

The roof frame 1 has multiple profiling, the profiling forming a linear guide 6 provided on the roof frame. A first sliding element 4 is accommodated on the linear guide 6 such that it can be displaced longitudinally along the linear guide 6. The first sliding element 4 comprises a sliding-element carrier 4a and also a first sliding block 4b and a second sliding block 4c, the sliding blocks 4b, 4c each being secured in a rotatable manner on the sliding-element carrier 4a. A hook 3 is accommodated on the sliding-element carrier 4a in a collinear manner with the axis of rotation of the second sliding block 4c and such that it can be rotated relative to the sliding-element carrier 4a.

Figure 2:
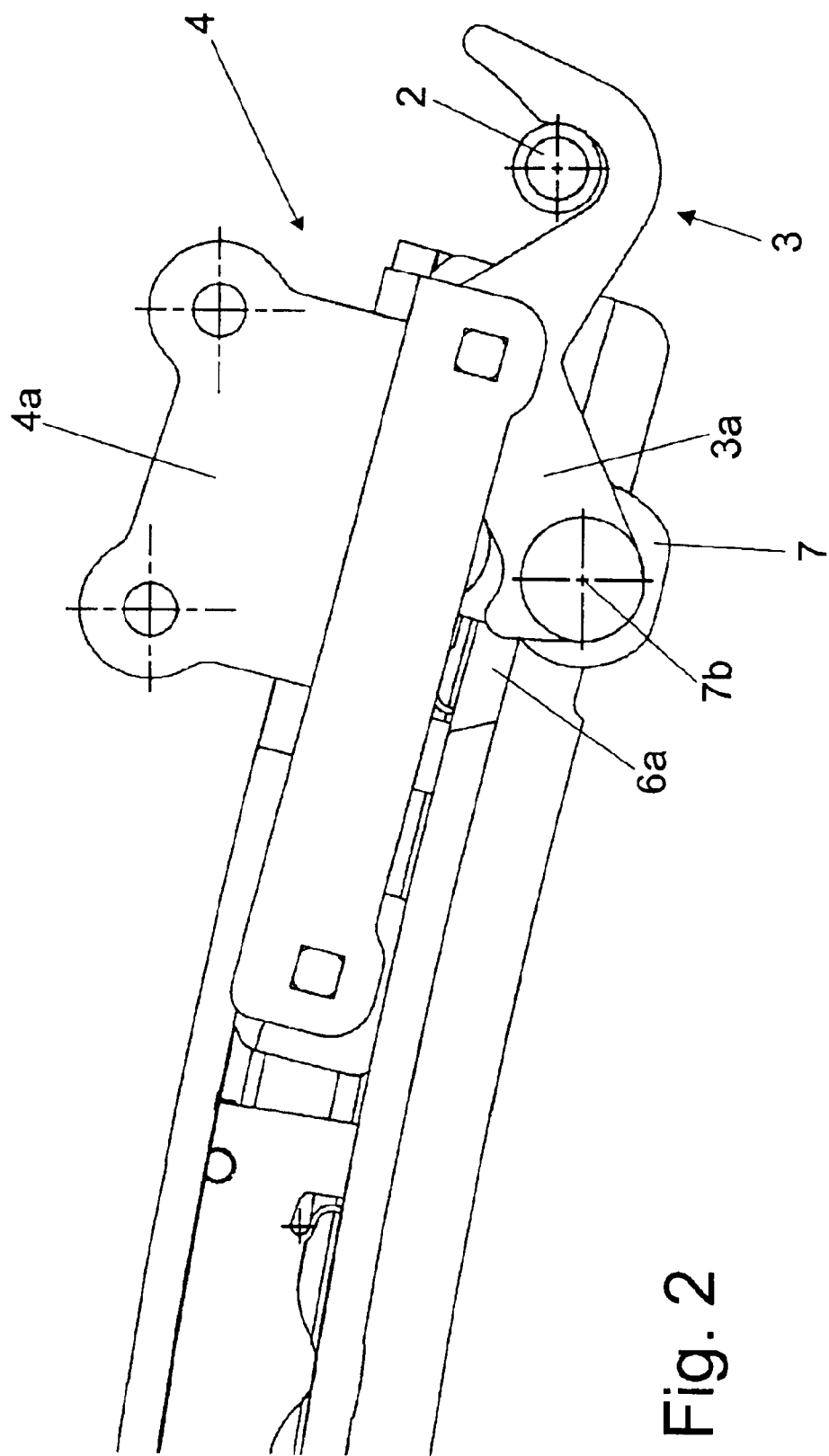
FIG. 2 shows the closure device from FIG. 1 in a closed state.
Figure 3:
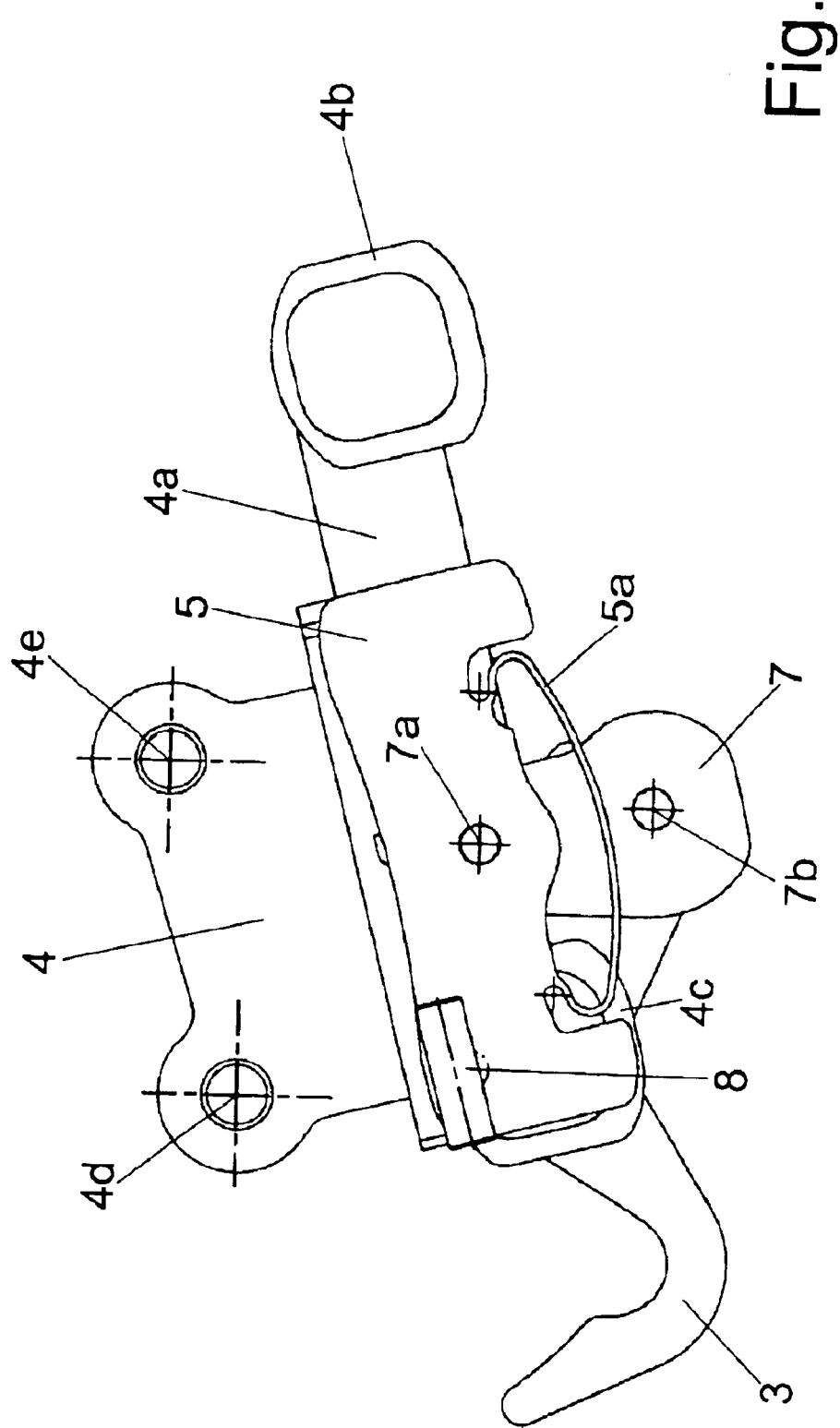
FIG. 3 shows a schematic side view from the rear of the closure device from FIG. 1, with the roof frame being omitted.

A second sliding element 5 is accommodated such that it can be moved linearly in the linear guide 6, and, in respect of the plan view according to FIGS. 1 and 2, parallel to the first sliding element 4 and behind the same. The second sliding element 5 is illustrated, in particular, in the rear view of FIG. 3, in which the illustration of the roof frame 1 has been omitted. The second sliding element 5 is designed to be shorter than the first sliding element 4 and it comprises a resilient guide bracket 5a, by means of which the second sliding element 5 can be moved smoothly in the linear guide 6. The second sliding element 5 can be moved in particular relative to the first sliding element 4 in the linear guide 6. Furthermore, a mount for the end of a driving cable 8 is provided on the second sliding element 5, with the result that a driving cable, which is laid along the roof frame 1, can drive a movement of the second sliding element 5 in the linear guide 6 in a straightforward and space-saving manner.

A control lever 7, on the one hand, is articulated on the second sliding element 5 at a joint 7a and, on the other hand, is secured in an articulated manner on a control extension 3a of the hook 3 at a joint 7b.

The first sliding element 4, in addition, has mounts 4d, 4e by means of which a front bow 10 of the folding/sliding top, said front bow 10 being designed as a hard shell element, is fixed to the first sliding element 4.

The linear guide 6 has a recess 6a in its front, bottom region. This recess 6a is provided merely in the region of the movement plane of the control link 7.

The invention functions as follows:

Starting from an open position of the closure device according to FIG. 1, the hook 3 having already been moved into the vicinity of the hoop catch 2, the closure operation is initiated. It should be noted here that that position of the closure device which is illustrated in FIG. 1 is an intermediate position, in which the control lever 7 has already entered part of the way into the recess 6a of the linear guide 6, with the result that the hook 3 has already rotated some way in the counterclockwise direction (according to FIG. 1).

Driven by the driving cable 8, the second sliding element 5 is then advanced in the direction of the front end of the roof frame 1, with the result that, by means of the articulation by way of the control link 7, the hook 3 engages with the hoop catch 2.

The end of the closing movement corresponds to the position according to FIG. 2, in which the hoop catch 2 is in full engagement with the hook 3. It can be seen from FIG. 2 that forces which act on the convertible top from the outside, and would cause the hook, for example, to open in the clockwise direction, are transmitted, in respect of the control link, essentially in the direction of the connection of the two articulations 7a, 7b of the control link 7, with the result that the driving cable 8 is subjected to the action of barely any resultant forces, if any at all. This results in the roof frame 1 being reliably secured on the frame element without the driving cable 8 having to apply retaining forces. The control link 7 is thus located in a dead-center position, which, depending on the configuration, may also be an over-dead-center position.

During the opening movement, the driving cable 8 is moved away from the front end of the roof frame 1, with the result that the second sliding element 5, in the first instance, carries along the control link 7 such that the hook 3 is opened in the clockwise direction in accordance with the illustration in FIG. 2. The first sliding element 4 is prevented from being carried along, in the first instance, by the connection between the hook 3 and the hoop element 2.

As soon as the control link 7 has been moved, in the opening direction, some way beyond the position shown in FIG. 1, the control link 7 is arranged essentially within the linear guide 6, and in a line with the extension 3a of the hook 3, and is prevented, by the top and bottom boundaries 6b, 6c of the linear guide 6, from pivoting relative to the sliding elements 4, 5. It is then possible for the first sliding element 4 and hence the front bow 10 to be moved together with the driven second sliding element 5 along a free path 6d of the linear guide 6 in the direction of the rear of the vehicle, in which case the folding/sliding top is opened.

In the closing direction, which is the direction of the front of the vehicle, the control link 7 and the extension 3a of the hook remain in a line as long as their articulation 7b does not pass the recess 6a, thereby preventing the hook from being turned into a closed unless it can catch the hoop catch 2.

What is claimed is:

1. A closure device for a convertible top, comprising:
   a lateral roof frame;
   a hoop element;
   a first sliding element;
   a second sliding element; and
   a hook arranged on the lateral roof frame and accommodated in a pivotable manner on the first sliding element, the hook being moveable to an engagement position for engaging with the hoop element,
   wherein the hook is pivotable by a drivable movement of the second sliding element relative to the first sliding element.

2. The closure device as recited in claim 1, wherein the lateral roof frame includes a linear guide and the first sliding element is guided linearly on the roof frame in the linear guide.

3. The closure device as recited in claim 1, wherein the lateral roof frame includes a linear guide and the second sliding element is guided linearly on the roof frame in a linear guide.

4. The closure device as recited in claim 1, further comprising a control link connected in an articulated manner to the hook.

5. The closure device as recited in claim 4, wherein the control link is connected in an articulated manner to the second sliding element.

6. The closure device as recited in claim 5, wherein the lateral roof frame includes a linear guide including a recess, and wherein the second sliding element is guided linearly in the linear guide such that the control link is retained in a first position relative to the second sliding element by means of the linear guide over the first part of the linear movement, and such that the control link is moveable relative to the second sliding element by means of the recess over a second part of the linear movement.

7. The closure device as recited in claim 6, further comprising a drive device for driving the second sliding element.

8. The closure device as recited in claim 7, wherein the drive device includes a driving cable secured on the second sliding element.

9. The closure device as recited in claim 4, wherein the control link is arranged in one of a dead center position and an over dead-center position relative to the hook when the hook is in full engagement with the hoop.

10. The closure device as recited in claim 1, further comprising a front bow secured on the first sliding element.

* * * * *